(12) United States Patent
Shin

(10) Patent No.: US 7,974,769 B2
(45) Date of Patent: Jul. 5, 2011

(54) INTEGRATED OPEN AND CLOSED-LOOP CONTROL METHOD FOR ACTIVE ENGINE MOUNTS

(75) Inventor: Kwang-Keun Shin, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1005 days.

(21) Appl. No.: 11/833,292

(22) Filed: Aug. 3, 2007

(65) Prior Publication Data

US 2009/0037048 A1 Feb. 5, 2009

(51) Int. Cl.
*G06F 19/00* (2011.01)

(52) U.S. Cl. ........ 701/111; 701/36; 180/300; 123/192.1

(58) Field of Classification Search ............... 701/36, 701/111; 123/192.1; 180/300
See application file for complete search history.

(56) References Cited

U.S. PATENT DOCUMENTS

| | | | | |
|---|---|---|---|---|
| 5,848,663 A | * | 12/1998 | Kuriki | 180/300 |
| 6,018,689 A | * | 1/2000 | Kumura et al. | 700/280 |
| 7,899,607 B2 | * | 3/2011 | Shin et al. | 701/111 |
| 2006/0074533 A1 | * | 4/2006 | Karaba et al. | 701/37 |
| 2007/0138338 A1 | * | 6/2007 | Luo et al. | 244/54 |
| 2009/0043451 A1 | * | 2/2009 | Harder et al. | 701/37 |
| 2009/0133949 A1 | * | 5/2009 | Shin et al. | 180/300 |

* cited by examiner

*Primary Examiner* — Khoi Tran
*Assistant Examiner* — Brian J Broadhead

(57) ABSTRACT

A system adapted for counteracting engine produced vibratory forces and isolating the forces from a body, includes active engine mounts, force or acceleration sensors, and a controller communicatively coupled to the mounts and sensors, and configured to execute an integrated open and closed-loop control method.

20 Claims, 7 Drawing Sheets x = time (sec)

Seat track acceleration (P) v. RPM

Steering col. acceleration (P) v. RPM

Front mount acceleration (P) v. RPM

Rear mount acceleration (P) v. RPM

INTEGRATED OPEN AND CLOSED-LOOP CONTROL METHOD FOR ACTIVE ENGINE MOUNTS

BACKGROUND OF THE INVENTION

1. Technical Field

The present invention relates to Active Engine Mounts (AEM) and methods of counteracting engine produced noise and vibration. More particularly, the present invention relates to an improved AEM system that integrates an open-loop control algorithm with a tunable closed-loop control algorithm to result in a rapidly responsive, adaptive and robust combination system.

2. Discussion of Prior Art

Electro-hydraulic devices, such as Active Engine Mount (AEM) systems have long been developed to counteract engine produced noise and vibratory forces. Recently, these devices and systems have become increasingly vital, as engine designs have endeavored to provide increased fuel efficiency at the cost of also increasing generative vibratory by-product. For example, Active Fuel management (AFM) engines, which function to autonomously deactivate half of the cylinders of an internal combustion engine during cruising, and the higher firing forces and cycles associated therewith have resulted in higher torque variations and, in turn, higher levels of structural vibrations.

Intermediately positioned between the engine and adjacent structure, AEM systems have traditionally included a passive spring and damper combination that isolate the adjacent structure from these static and dynamic loads. As shown in prior art FIG. 1, recent AEM systems 1 have further included a generator 2, such as a solenoid, voice coil, or other electromagnetic device. When active, the generator 2 receives an instructive signal and produces a counteractive output (i.e., restoring force) based on the signal. The output resultantly isolates the vibrations that would be otherwise transmitted from the engine to the adjacent structure.

In one type of conventional AEM system, the signal is pre-determined and produced by an open-loop controller, and is typically a function of vehicular and/or engine specific characteristics. This type of system provides a rapid-response dampening effect, as shown in the exemplary open-loop output graph of FIG. 2. In this simulation, the open-loop AEM system was activated at a time 0.5 sec to enable comparisons between pre-and-post-activation. A residual vibration resulted after the control was activated, which took into effect modeling error inserted into the open-loop algorithm to simulate un-modeled disturbances, intra-vehicular degradation over time, and inter-vehicular variations amongst different makes and models. It is appreciated that these errors almost always result in measurable inaccuracy within an open-loop control system.

To enable AEM systems to achieve their overall final control objective more consistently, closed-loop systems have been developed that utilize sensory feedback to improve performance. This type of system typically includes a plurality of sensors (one at each engine mount) that sense and generate a correlative signal of noise and vibration occurring at the engine mount. The sensor feedback is used to modify the input signal to the generator 2, and accordingly converge the residual vibration towards a targeted threshold. As a result, a more robust and adaptive system is presented.

While improving isolation, however, conventional closed-loop AEM control algorithms present inferior response times in comparisons to open-loop systems. This is shown in the closed-loop simulation output graph of FIG. 3. As detected by the model, an incipient activation period of high vibration results, which presents repetitive opportunity for compromising structural integrity, and creating operator discomfort. Of further concern, it is further appreciated that such a period will occur during each change in rpm or engine torque.

Thus, AEM systems are becoming increasingly necessary, however, they continue to present adaptivity and responsiveness concerns associated with open and closed-loop variations, respectively. As a result, there remains a need in the art for a rapid response AEM system that provides robust and adaptive control capabilities.

SUMMARY OF THE INVENTION

Responsive to these concerns, the present invention presents an integrated open and closed-loop control AEM system that is based upon a single-tone adaptive feed-forward control framework. The inventive system is useful, among other things, for counteracting vibratory forces produced by an engine. The inventive system provides certain advantages and improvements over the prior art, including the inclusive provision of both a rapid response open-loop algorithm, and an adaptive closed-loop system that converges the remaining residual vibration towards a targeted threshold. The system features programmable algorithmic improvements and as such, can be readily implemented within existing AEM-equipped vehicles.

The invention concerns an integrated closed-loop method of counteracting the effects of vibratory forces produced by an engine, and isolating the forces from an adjacent body, wherein the engine presents a manifold absolute pressure, crank angle ($\theta$), speed ($\omega$), and firing frequency equal to $\omega$ times an order (p). At initial steps, the firing frequency and the manifold absolute pressure are entered into an open-loop control algorithm, which is then executed to determine an open-loop control input. Engine characteristic data, including the frequency and pressure are entered into a closed-loop control algorithm, which is executed to determine a closed-loop control input. The open and closed-loop control inputs are combined to achieve a resultant control input signal. The resultant is then delivered to at least one active engine mount, so as to generate a counteracting output that results in a current residual vibration at the mount. Finally, the current residual vibration is determined, the characteristic data is modified to include the current residual vibration, and the current residual vibration is fed back to the closed-loop control algorithm as engine characteristic data.

Structurally, the invention concerns a system comprising at least one active engine mount intermediately positionable between the engine and body, and including a generator. At least one force (or acceleration) sensor is adjacent each of said at least one mount, and configured to detect the vibratory forces (or accelerations) at the mount and to generate a corresponding current vibration signal. A controller is communicatively coupled to the engine, mount and sensor, and configured to receive the engine characteristics, including the signal, perform integrated open and closed-loop control algorithms, to determine a control input, and transmit the control input to the generator. The preferred controller further includes a memory storage device having a look-up table stored thereupon. The open-loop control algorithm is performed in part by comparing the engine characteristics to the table. Finally, and more preferably, a power amplifier is intermediately positioned and operable between the controller and each of said at least one mount.

Yet further aspects, embodiments, and advantages of the present invention, including description of the open and closed-loop algorithms in frequency domain, description of an update (or adaptation) sub-routine, and implementation methods including a time-domain approximation of the control input having a tunable lumped gain will be apparent from the following detailed description of the preferred embodiment(s) and the accompanying drawing figures.

BRIEF DESCRIPTION OF DRAWINGS

Preferred embodiments of the invention are described in detail below with reference to the attached drawing figures, wherein.

DETAILED DESCRIPTION OF THE INVENTION

Figure 4:
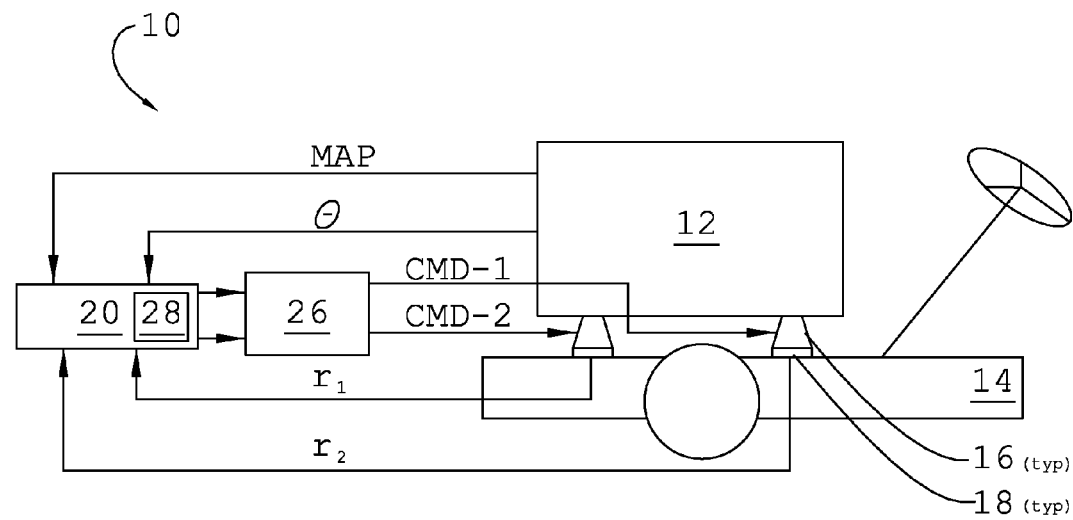
FIG. 4 is a schematic diagram of the physical configuration of an integrated AEM system in accordance with a preferred embodiment of the invention.

As best shown in FIG. 4, the present invention concerns an integrated open and closed-loop AEM system 10 adapted for use with an engine 12 and adjacent vehicular structure (e.g., body) 14. The system 10 is generally operable to counteract noise and vibratory forces produced by the engine 12, so as to isolate these disturbances from the structure 14. The system 10 will be further described and simulated herein with respect to an internal combustion engine, such as the aforementioned AFM engine; however, it is certainly within the ambit of the invention to utilize the system 10 wherever engine produced disturbance is sought to be isolated. Further it is appreciated that the system 10 may be used with various vehicle types, such as automobiles, boats, trucks, etc.

Figure 1:
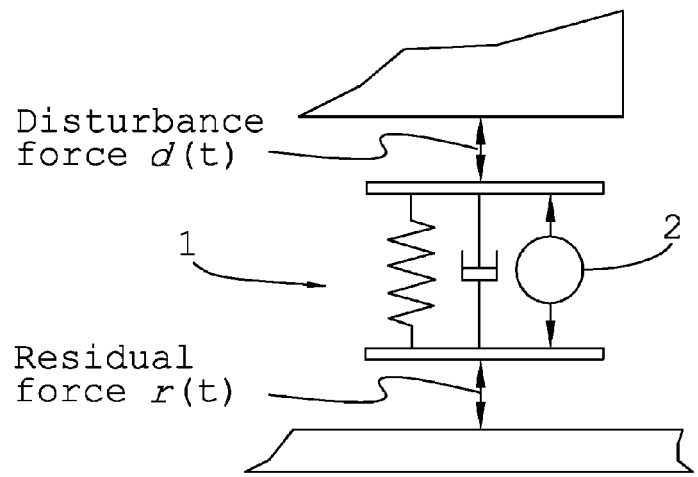
FIG. 1 is a prior art schematic representation of an Active Engine Mount (AEM), particularly illustrating a force generator, spring and damper intermediate an engine and vehicle structure.

Turning to the physical configuration of the system 10, at least one, and more preferably a plurality of AEMs 16 (FIG. 4) are provided and positioned intermediate the engine 12 and structure 14. The AEMs 16 present standard AEM configuration, including a signal-processing generator, such as shown in FIG. 1. As previously mentioned, the generator is configured to receive a control input signal and produce a restoring force based on the signal. Each AEM 16 further includes a force (or acceleration) sensor 18 adjacent the structure 14. The force (or acceleration) sensor 18 is configured to detect vibratory forces (or accelerations) for the particular application and as such presents suitable sensitivity and accuracy ranges. The sensor 18 feeds information including the amplitude and period of the vibratory force to a main controller 20 (e.g., at least one electronic control unit equipped to perform the intended functions and algorithms of the invention).

Figure 5:
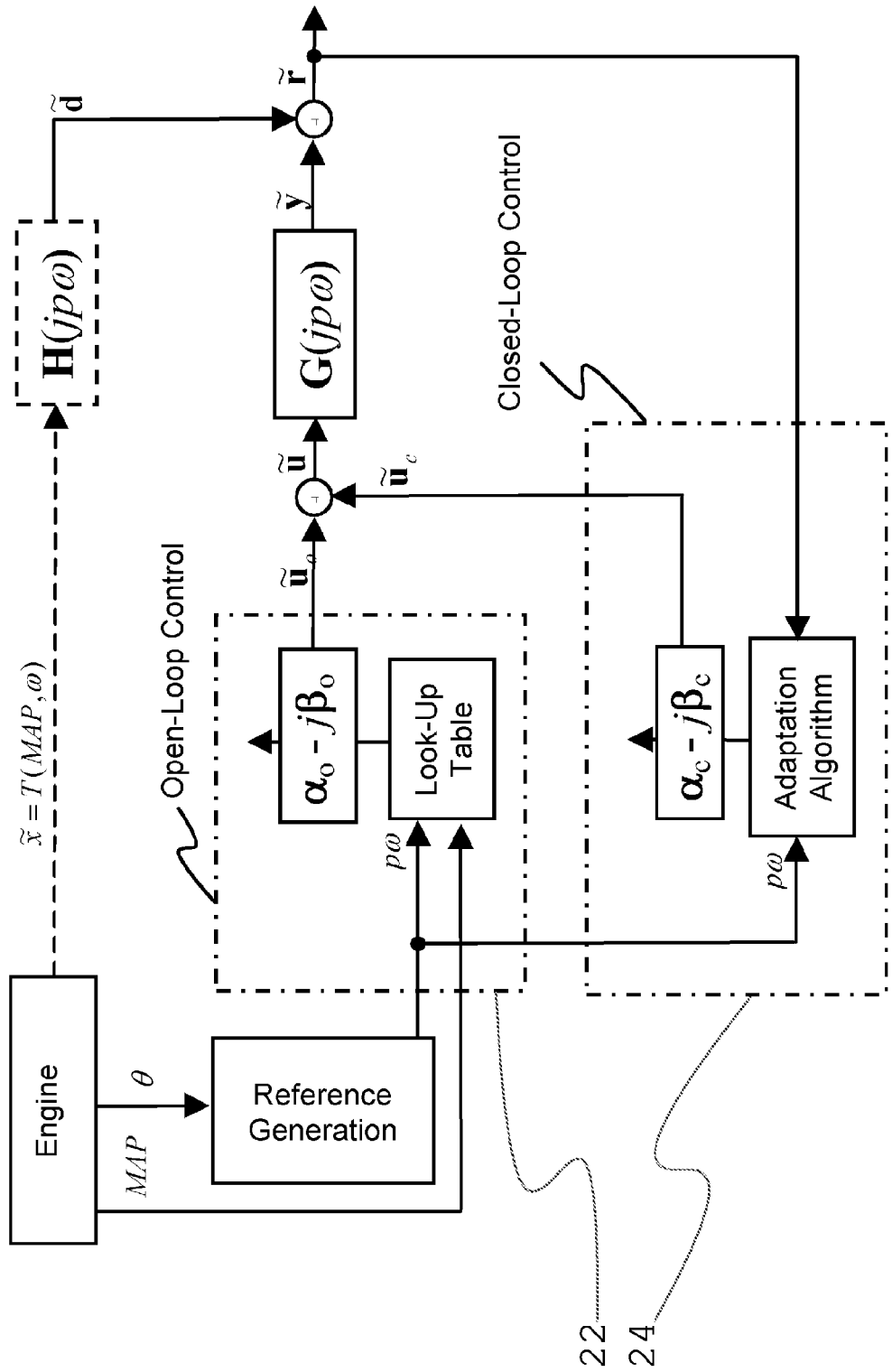
FIG. 5 is a diagram of the functional structure, including the open and closed-loop control modules, of the controller, in accordance with a preferred embodiment of the invention.
Figure 6:
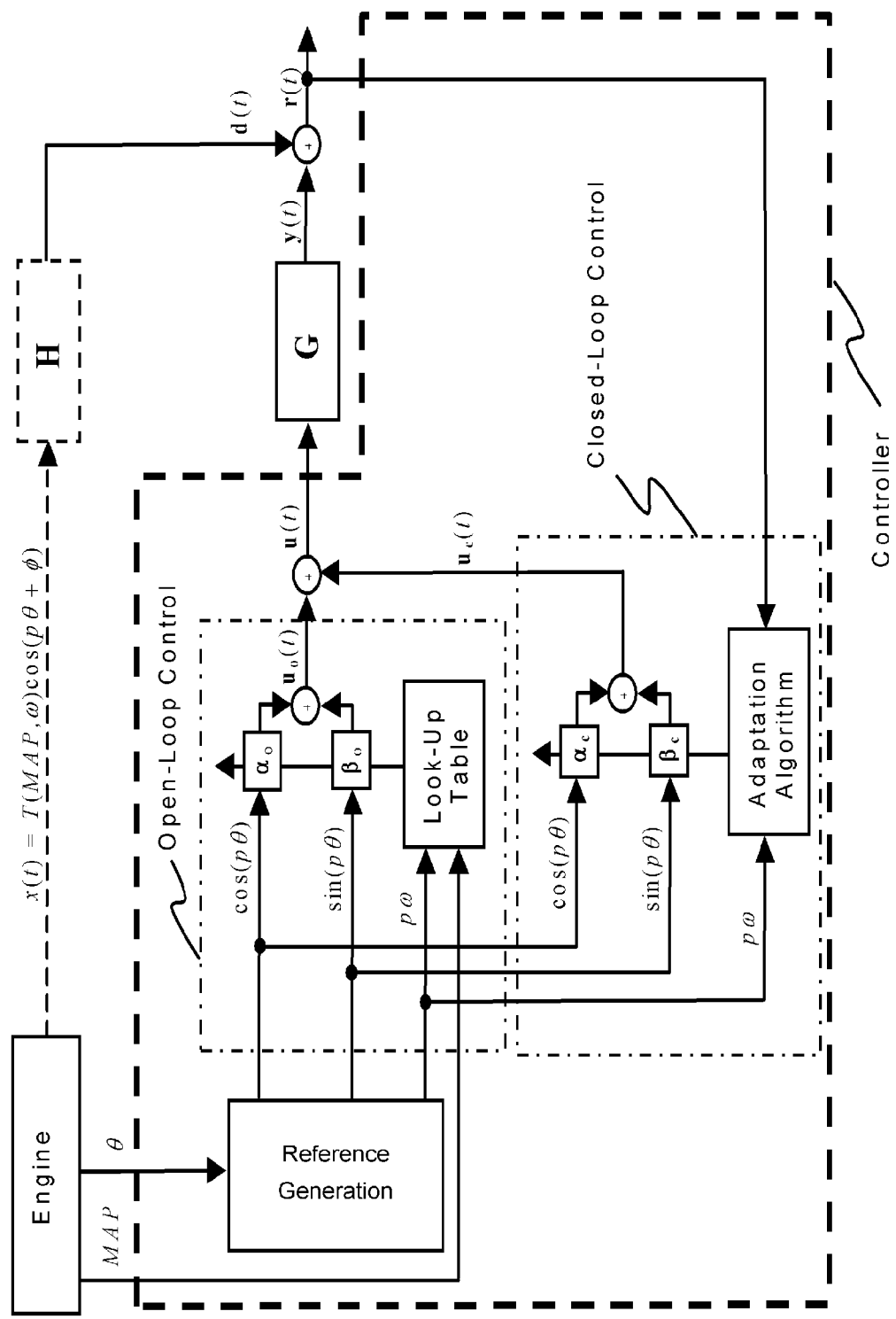
FIG. 6 is a diagram of the functional structure of the controller shown in FIG. 5, expressed in frequency domain.

As shown in FIGS. 5 and 6, the controller 20 includes integrated open and closed-loop control modules 22,24 for simultaneously performing open and closed-loop algorithms respectively. The preferred open-loop control module 22 is designed based upon the crank speed and manifold absolute pressure (MAP) of the engine 12, and the preferred closed-loop module 24 is designed based upon the speed, and a single-tone adaptive feed-forward control framework. As such, the controller 20 is communicatively coupled (i.e., connected by hardwire or wireless communication technology) to the other components of the system 10.

I. Control System Description

In the illustrated embodiment two passive mounts are located on the neutral torque axis and do not transmit vibrations, so that only two vibratory forces (or accelerations), $r_1$ and $r_2$, are considered (FIG. 4). As the engine 12 operates, most of the engine vibrations are transmitted to the body 14 through the two active AEMs 16. The controller 20 receives the MAP and crank angle, θ, from the engine 12, as well as $r_1$ and $r_2$. The controller 20 then calculates appropriate control inputs to drive two power amplifiers 26 that supply powered voltage to the AEMs 16, so that the AEMs 16 generate a restoring force wave between the AEMs 16 and the body 14.

More particularly, where the crank angle of the engine is denoted as θ, and crank speed is denoted as ω, which is time derivative of θ, the firing frequency is p times faster than ω and the number p is called the "order." For example, the firing frequency of a six-cylinder engine in half cylinder mode is 1.5 ω and is called the "$1.5^{th}$ order." The engine torque variation is denoted as x(t) and, it is a sinusoid of firing frequency. Its amplitude T(MAP, ω) is the function of both manifold absolute pressure (MAP) and the crank speed ω. The torque variation x(t) excites the structure 14 resulting in the disturbance vibration vector d(t) of the sensors 18. A transfer function matrix from x(t) to d(t) is denoted as H and is called the "primary path transfer function."

The controller 20 drawn in the dash-lined block (FIG. 6) inputs MAP and θ from the engine 12 and outputs the vector of control input signal u(t) that drives the amplifiers 26 moves the active mounts 16, excites the structure 14, and generates the control response vector y(t) of the sensor locations. The transfer function matrix G from u(t) to y(t) is called the "secondary path transfer function" and it is the lumped dynamics of the amplifiers 26, the mounts 16, and the structure 14. According to the principle of superposition, the sum of d(t) and y(t) becomes residual vector r(t), which is the actual measurement from the sensors 18. The control objective is to minimize the firing frequency ($p^{th}$ order) content of the residual vector r(t) by manipulating control response vector y(t).

The controller 20 first generates $\cos(p\theta)$ and $\sin(p\theta)$ which are the basis of the firing frequency content, and it also calculates firing frequency $p\omega$ from the crank angle $\theta$. As previously stated, the controller 20 consists of two main algorithms: open-loop and closed-loop control, wherein the open-loop control depends only on the information from the engine 12 while the closed-loop control also utilizes the sensor information.

The open-loop control generates the control input $u_o(t)$ of the form:

$$u_o(t) = \alpha_o \cos(p\theta) + \beta_o \sin(p\theta), \quad (1)$$

and the coefficient vectors $\alpha_o$ and $\beta_o$ are scheduled through a two dimensional look-up table based on the MAP and crank speed $\omega$.

The closed-loop control generates the control input vector $u_c(t)$ of the form:

$$u_c(t) = \alpha_c \cos(p\theta) + \beta_c \sin(p\theta), \quad (2)$$

where the coefficients $\alpha_c$ and $\beta_c$ are modified by the adaptation algorithm driven by the residual vibration r(t). The resultant control input u(t) is the sum of $u_o(t)$ and $u_c(t)$.

I. Frequency Domain Description

Since the frequency of interest is a single frequency of $p^{th}$ order, the controller 20 is more preferably designed in frequency domain. That is to say, all the signals and modules involved in FIG. 5 are preferably described in frequency domain, as shown in FIG. 6. As such, the Fourier coefficient of a signal r(t) associated with $p^{th}$ order is written as:

$$\tilde{r} = \frac{2}{T_p} \int_{t-T_p}^{t} r(t) e^{-jp\omega t} dt, \quad (3)$$

where $T_p$ is the period of r(t), and '~' denotes a complex vector (number). Therefore, the frequency domain version of the open-loop control input $u_o(t)$ is:

$$\tilde{u}_o = \frac{2}{T_p} \int_{t-T_p}^{t} u_o(t) e^{-jp\omega t} dt = \alpha_o - j\beta_o \quad (4)$$

A. Open-Loop Control Algorithm

The open-loop control is designed by setting the closed-loop control input to zero, i.e., $\tilde{u}_c = 0$, so that the frequency domain system equation becomes:

$$\tilde{r} = \tilde{d} + \tilde{G}(jp\omega)\tilde{u}_o. \quad (5)$$

The natural control objective is to make the residual vibration zero, i.e.

$$\tilde{d} + \tilde{G}(jp\omega)\tilde{u}_o = 0. \quad (6)$$

The weighted least square solution of equation (6) is then, $$\tilde{u}_o = -[\tilde{G}(jp\omega)^* Q \tilde{G}(jp\omega)]^{-1} \tilde{G}(jp\omega)^* Q \tilde{d}, \quad (7)$$

wherein, Q is a positive definite matrix that penalizes the relative amplitude of the residual vibration. In fact, equation (7) is the minimizing solution of the following cost function:

$$J = \frac{1}{2} \tilde{r}^* Q \tilde{r}. \quad (8.a)$$

The disturbance $\tilde{d}$ can be measured off-line and is a function of excitation frequency and the intensity of the excitation.

$$\tilde{d} = \tilde{H}(jp\omega) T(MAP, \omega). \quad (8.b)$$

Therefore, the open-loop coefficients are a function of crank speed and MAP, and preferably stored in two-dimensional look-up tables (not shown).

$$\alpha_o = f_\alpha(\omega, MAP), \quad (9)$$

$$\beta_o = f_\beta(\omega, MAP). \quad (10)$$

As such, the controller 20 preferably includes memory storage capabilities, such as a memory storage device 28 that can be queried on demand. More preferably, the storage device 28 and self-contained look-up tables are removably coupled to the controller 20, so as to facilitate interchangeability, updating, etc. Alternatively, the storage device 28 may be communicatively coupled to a third party (also not shown) that is configured to periodically update the look-up tables through wireless technology.

Figure 2:
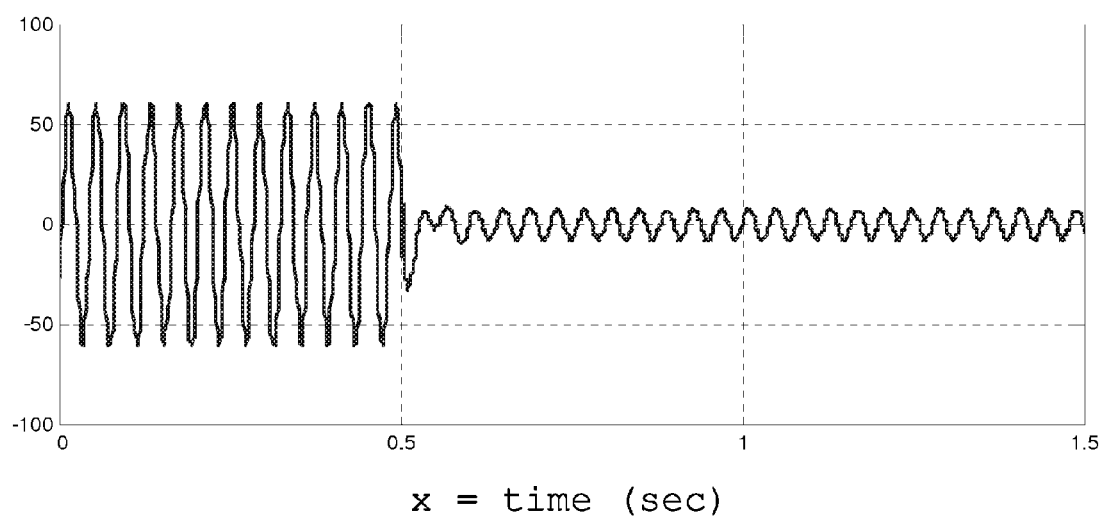
FIG. 2 is a simulation output graph of a prior art open-loop control AEM system being applied to a vibratory force at time 0.5 sec, particularly illustrating a rapid response and residual vibration.

If the disturbance is from the engine 12 only and the look-up table values (9) and (10) are perfectly detected and delivered to the algorithm, then the open-loop control module 22 alone can achieve the control objective. In practice, however, un-modeled disturbances, sensory equipment tolerances, intra-vehicular degradation over time, and/or inter-vehicle variations always cause some error (i.e., residual vibration) in the open-loop control result (FIG. 2).

B. Closed-Loop Control Algorithm

The preferred system 10 also includes a Single-Tone Adaptive Feed-forward Control (STAFC) closed-loop control method. It is appreciated that because of its simplicity in real-time calculation and its systematic design, field engineers are able to tune the control algorithm without knowing the details of the theory.

From FIG. 6, the frequency domain system equation of the closed-loop control may be written as follows:

$$\tilde{r} = \tilde{d} + \tilde{G}(jp\omega)\tilde{u}_o + \tilde{G}(jp\omega)\tilde{u}_c. \quad (11)$$

In this module 24, the control problem is to minimize the cost function in equation (12) by recursively updating $\tilde{u}_c$.

$$J = \frac{1}{2} \tilde{r}^* Q \tilde{r}. \quad (12)$$

Assuming that the closed-loop control input is updated from $\tilde{u}_{c,old}$ to $\tilde{u}_{c,new}$ in one iteration (i.e., cycle), and the corresponding residual vibration changes from $\tilde{r}_{old}$ to $\tilde{r}_{new}$, the change of the control input is then $\Delta \tilde{u}_c = \tilde{u}_{c,new} - \tilde{u}_{c,old}$ and the change of the cost is then $\Delta J = J_{new} - J_{old}$. Assuming small changes, the following first order approximation holds by ignoring higher order terms of Tailor series:

$$\Delta J \approx (\partial J / \partial \tilde{u}_c)^* \Delta \tilde{u}_c. \quad (13)$$

The gradient $(\partial J / \partial \tilde{u}_c)$ at the current iteration is therefore, $$\frac{\partial J}{\partial \tilde{u}_c} = \frac{1}{2} \frac{\partial}{\partial \tilde{u}_c} (\tilde{r}^* Q \tilde{r}) = \tilde{G}^*(j\omega) Q \tilde{r}. \quad (14)$$

If the update algorithm is chosen as $$\Delta \tilde{u}_c = -\gamma \tilde{G}^*(jp\omega) Q \tilde{r}_{c,old}, \quad (15)$$

where $\gamma$ is the update gain, then equation (13) becomes:

$$\Delta J \approx -\gamma (\partial J/\partial \tilde{u}_c)^* (\partial J/\partial \tilde{u}_c) \leq 0. \quad (16)$$

Therefore, for a sufficiently small $\gamma$, the cost function decreases as iterations proceeds:

$$J_{new} \leq J_{old}. \quad (17)$$

Consequently, the update algorithm is:

$$\tilde{u}_{c,new} = \tilde{u}_{c,old} - \gamma \tilde{G}^*(jp\omega) Q \tilde{r}_{c,old}. \quad (18)$$

C. Robustness of the Update Algorithm

The update algorithm in equation (18) requires transfer function matrix $\tilde{G}(jp\omega)$. In practice, however, the true transfer function is different from the model $\tilde{G}(j\omega)$ due to inevitable variations, and may be expressed as follows:

$$\tilde{G}_t(j\omega) = \tilde{G}(j\omega)[I + \Delta(j\omega)], \overline{\sigma}\{\Delta(j\omega)\} < 1. \quad (19)$$

In equation (19) the multiplicative deviation $\Delta(j\omega)$ of the true system from the model is assumed to be less than 1, which allows 100 percent deviation from the model. With the true system, the true residual vibration may be re-written as follows:

$$\tilde{r}_{old} = \tilde{d} + \tilde{G}_t(jp\omega) \tilde{u}_o + \tilde{G}_t(jp\omega) \tilde{u}_{c,old}. \quad (20)$$

The following new closed-loop control input is obtained by substituting equation (20) into equation (18), as progressively follows:

$$\tilde{u}_{c,new} = \tilde{u}_{c,old} - \gamma \tilde{G}^*(j\omega) Q \tilde{r}_{old} \quad (21)$$
$$= [I - \gamma \tilde{G}^*(j\omega) Q \tilde{G}(j\omega)] \tilde{u}_{c,old} -$$
$$\gamma \tilde{G}^*(j\omega) Q [\tilde{G}_t(jp\omega) \tilde{u}_o + \tilde{d}]$$
$$= [I - \gamma \{\tilde{G}^*(j\omega) Q \tilde{G}(j\omega) \{I + \Delta(j\omega)\}] \tilde{u}_{old} -$$
$$\gamma \tilde{G}^*(j\omega) Q [\tilde{G}_t(j\omega) Q [\tilde{G}_t(jp\omega) \tilde{u}_o + \tilde{d}].$$

Equation (21) is nothing more than a first order difference equation whose convergence is, therefore, guaranteed if $$\overline{\sigma}[I - \gamma \tilde{G}^*(j\omega) Q \tilde{G}(j\omega) \{I + \Delta(j\omega)\}] \leq 1, \quad (22)$$

wherein sigma-bar is the standard of deviation of the true system.

The inequality (22) is true if the following is true:

$$\gamma \overline{\sigma}[\tilde{G}^*(j\omega) Q \tilde{G}(j\omega) \{I + \Delta(j\omega)\}] \leq 1; \quad (23)$$

and since $$\overline{\sigma}\{I + \Delta(jp\omega)\} \leq 2, \quad (24)$$

inequality (23) is true if $$\gamma \overline{\sigma}\{\tilde{G}^*(j\omega) Q \tilde{G}(j\omega)\} \leq \tfrac{1}{2}. \quad (25)$$

Consequently, inequality (22) is true if the following is met:

$$\gamma \leq \frac{1}{2 \overline{\sigma} \{\tilde{G}^*(j\omega) Q \tilde{G}(j\omega)\}}. \quad (26)$$

Therefore the convergence of the update algorithm (18) is guaranteed if the update gain $\gamma$ satisfies inequality (26) and the deviation of the true system from the model is less than 100 percent.

D. Frequency-Domain Adaptation

The adaptation algorithm (18) can be implemented in frequency-domain by collecting signal r(r) for a block of time, calculating $p^{th}$ order Fourier coefficient of the data block by using either equation (3) or FFT, updating the Fourier coefficients of the control input $\tilde{u}_c$, and waiting until the transient response (total residual vibratory forces) falls below a maximum threshold, before starting a new collection of r(t). Depending on the dynamics of the secondary path transfer function, one iteration of the frequency-domain adaptation requires at least a couple of vibration periods, which results in a delay of one iteration and impairs system performance.

E. Time-Domain Adaptation

More preferably, the adaptation algorithm (18) is implemented using time-domain approximation, which eliminates the need for collecting and processing block data, reduces the delay, and enables smooth control. Assuming $\tilde{u}_c$ is not a constant but rather a continuous function of time, i.e., $\tilde{u}(t)$, then for one period, the following integral relationship holds:

$$\int_{t-T_p}^{t} \frac{d\tilde{u}(t)}{dt} dt = \tilde{u}(t) - \tilde{u}(t-T_p). \quad (27)$$

If we consider $\tilde{u}(t) = \tilde{u}_{new}$ and $\tilde{u}(t-T_p) = \tilde{u}_{old}$, then equation (27) gives $$\int_{t-T_p}^{t} \frac{d\tilde{u}(t)}{dt} dt = \tilde{u}_{new} - \tilde{u}_{old} = -\gamma \hat{\tilde{G}}^*(jp\omega) Q \tilde{r}_{old}. \quad (28)$$

From the definition of Fourier coefficient in equation (3), equation (18) can be approximated as, $$\int_{t-T_p}^{t} \frac{d\tilde{u}(t)}{dt} dt = -\frac{2\gamma}{T_p} \tilde{G}(jp\omega)^* Q \int_{t-T_p}^{t} r(t) e^{-jp\omega t} dt. \quad (29)$$

By removing the integrations, the time domain approximation of equation (18) is written as follows:

$$\frac{d\tilde{u}(t)}{dt} = -\frac{2\gamma}{T_p} \tilde{G}(jp\omega)^* Q r(t) e^{-jp\omega t}. \quad (30)$$

In discrete-time implementation, therefore, (30) becomes:

$$\tilde{u}(t_{k+1}) = \tilde{u}(t_k) - \mu \hat{\tilde{G}}(jp\omega)^* Q r(t_k) e^{-j\omega t_k}, \quad (31)$$

wherein $\mu$ is a lumped gain of $\gamma$ and discrete sampling time. More preferably, $\mu$ further presents a tunable gain. As $\mu$ approaches zero, the system 10 grows increasingly stable but the response time becomes longer. Contrarily, a higher $\mu$ reduces the response time but can cause instability if excessively high. Therefore, the controller gain $\mu$ should be manually tuned to reduce response time without causing instability.

More preferably, $\mu$ is autonomously tunable by the controller 20 between pre-determined hypo-responsive and unstable thresholds. In this configuration, the controller 20 is further configured to record an initial activation time for the active engine mounts 16, and compare the total residual vibration to an acceptable threshold. The closed-loop algorithm completes a plurality of iterations and converges upon the target value, until the residual vibration falls below the acceptable threshold. An acceptable residual vibration time is then recorded, and the initial activation time is subtracted therefrom to determine a system responsiveness period. The lumped gain $\mu$ is then tuned based on the responsiveness period; for example, by increasing or decreasing $\mu$ in direct proportion to the difference.

In the illustrated embodiment, Equation (30) is the preferred final version of discrete-time adaptation algorithm, and forms the basis of the following simulations.

II. Simulations

Figure 3:
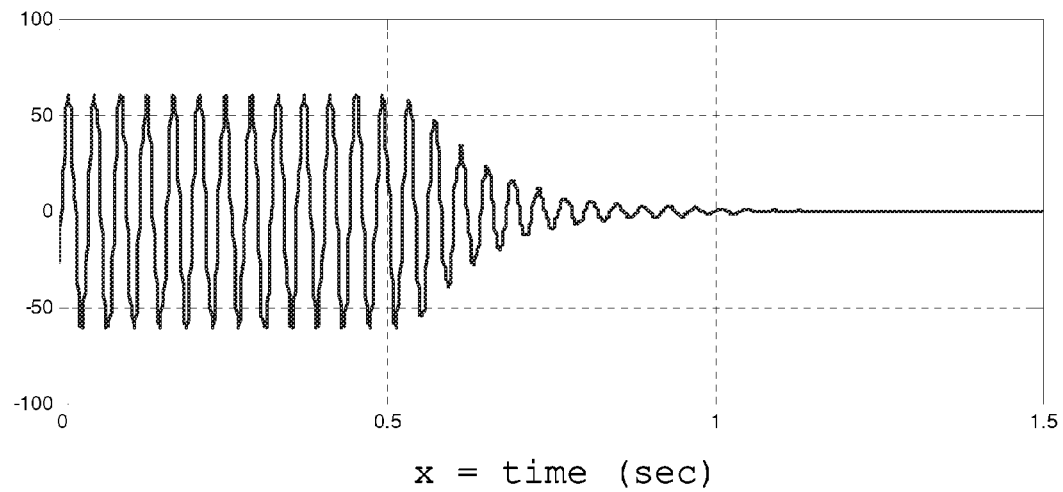
FIG. 3 is a simulation output graph of a prior art closed-loop control AEM system being applied to a vibratory force at time 0.5 sec, particularly illustrating a slow response and convergence of the residual vibration upon a targeted value.

Remembering that the open-loop control is shown to have faster response time and the closed-loop control is shown to have good final performance, the following simulation was performed to show the combined effects of the open and closed-loop control algorithms when simultaneously applied in accordance with the present invention. Like the open and closed-loop simulations of FIGS. 2 and 3, in this simulation, a six cylinder engine was set to half-cylinder AFM mode, and the crank speed was set to a constant of 1000 RPM. The controller 20 was activated at 0.5 sec so that vibration levels before and after 0.5 sec could be compared.

Figure 7:
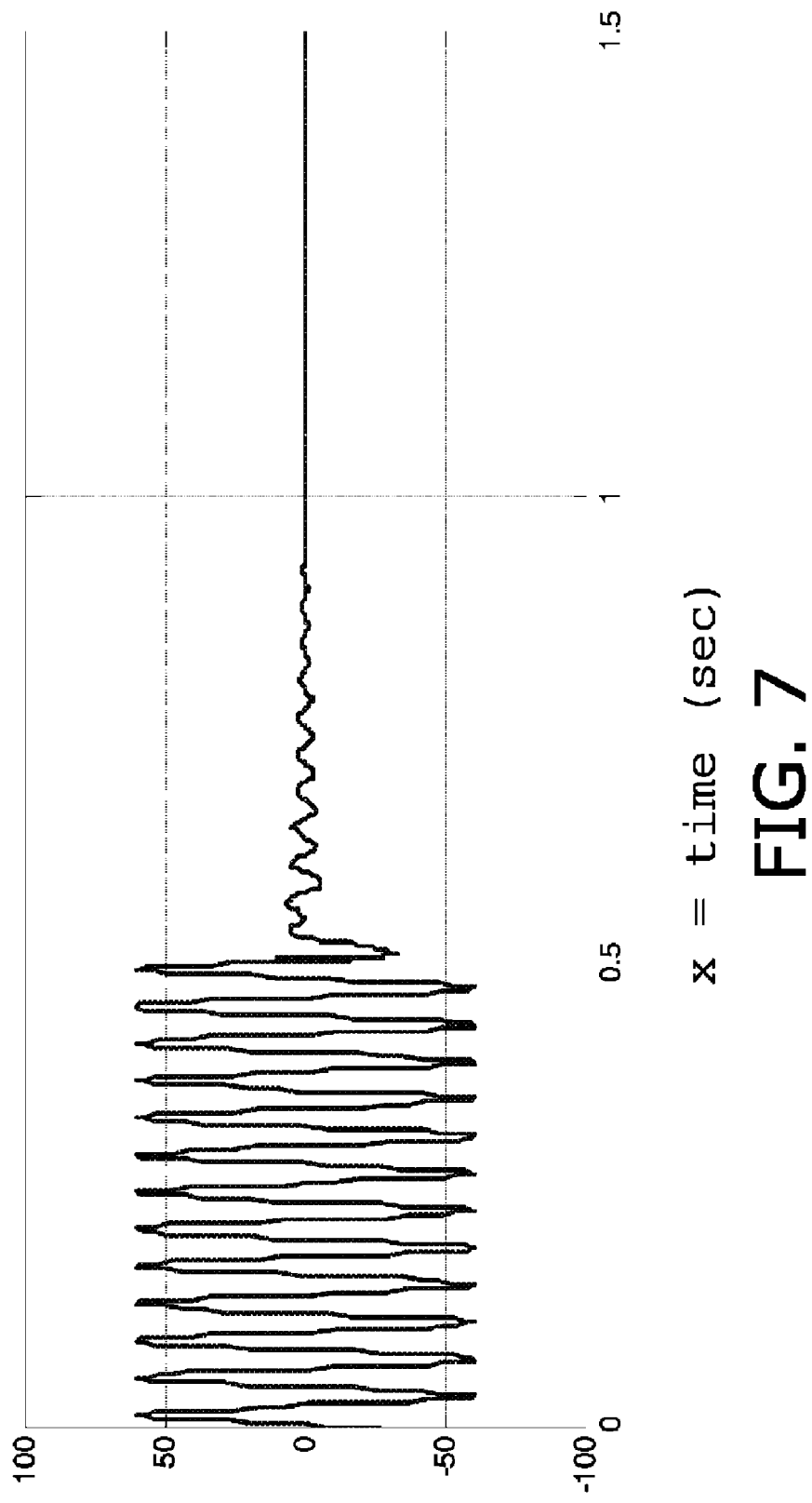
FIG. 7 is a simulation output graph of an integrated open and closed-loop control AEM system in accordance with a preferred embodiment of the invention, being applied to a vibratory force at time 0.5 sec, particularly illustrating a rapid response and convergence of the residual vibration upon a targeted value.

As shown in FIG. 7, by integrating the open and closed-loop controls, the system 10 achieved a rapid response time generally comparable to the open-loop model, as well as final performance (i.e., reduced residual vibration amplitude) generally comparable to the closed-loop model. In other words, the control algorithm immediately suppressed the force to a reduced level as soon as the control was activated, and the closed-loop control asymptotically suppressed the residual force (or acceleration) down to negligible amounts.

Figure 8:
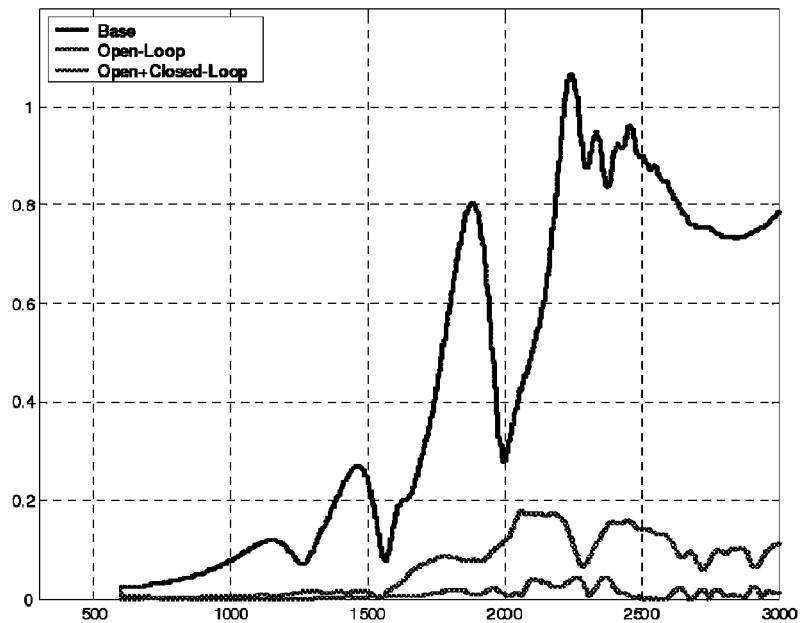
FIG. 8 is a line graph showing the simulation results of an integrated open and closed-loop system being applied to vibratory forces acting upon a seat track, particularly illustrating a $p^{th}$ order magnitude of seat track acceleration versus RPM.
Figure 9:
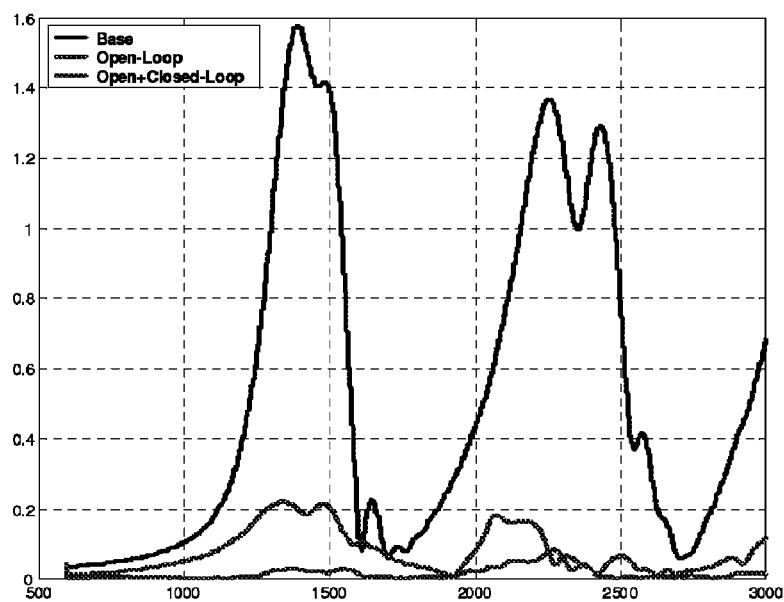
FIG. 9 is a line graph showing the simulation results of an integrated open and closed-loop system being applied to vibratory forces acting upon a steering column, particularly illustrating a $p^{th}$ order magnitude of steering column acceleration versus RPM.
Figure 10:
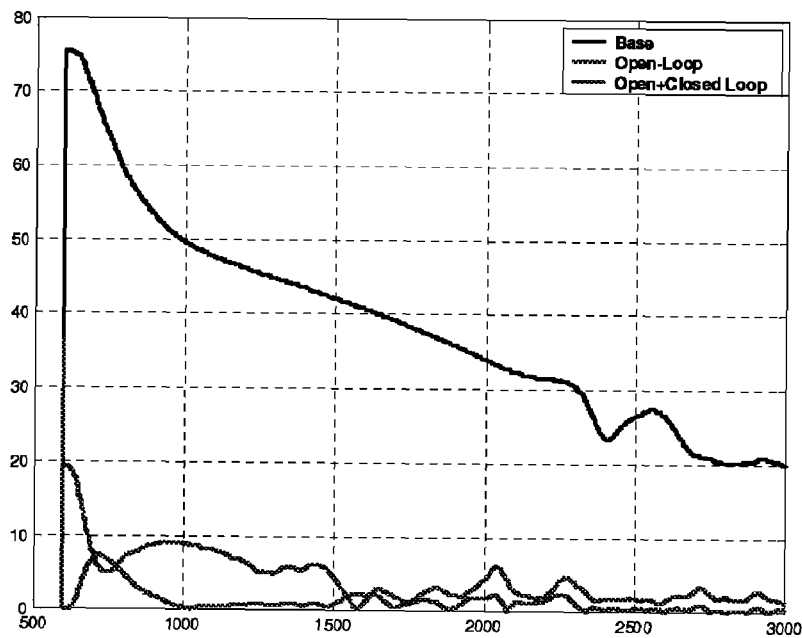
FIG. 10 is a line graph showing the simulation results of an integrated open and closed-loop system being applied to vibratory forces acting upon a front mount, particularly illustrating a $p^{th}$ order magnitude of front mount force versus RPM.
Figure 11:
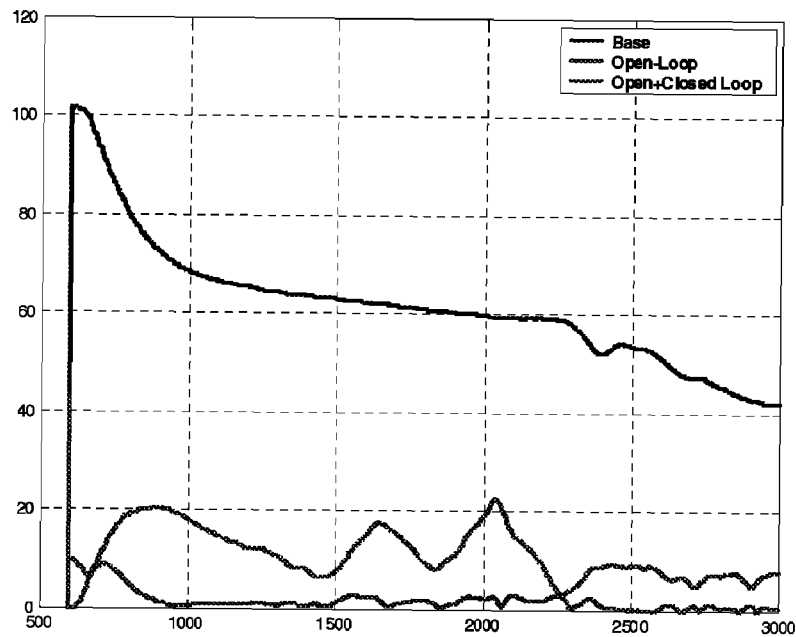
FIG. 11 is a line graph showing the simulation results of an integrated open and closed-loop system being applied to vibratory forces acting upon a rear mount, particularly illustrating a $p^{th}$ order magnitude of rear mount force versus RPM.

Additional simulations were performed that show the effects of RPM sweep on integrated open and closed-loop control. In these simulations, the engine RPM changes with the sweep from 600 to 3000 RPM in 5 seconds in half-cylinder mode of the six cylinder engine. FIGS. 8 and 9 show the $p^{th}$ order magnitude of seat track acceleration and steering column acceleration, and FIGS. 10 and 11 show the $p^{th}$ order magnitude of corresponding front and rear mount forces, respectively. In these simulations, as well, the open-loop control drastically reduced the vibrations, while the closed-loop control further reduced the residual vibration.

The preferred forms of the invention described above are to be used as illustration only, and should not be utilized in a limiting sense in interpreting the scope of the present invention. Obvious modifications to the exemplary embodiments and modes of operation, as set forth herein, could be readily made by those skilled in the art without departing from the spirit of the present invention. The inventors hereby state their intent to rely on the Doctrine of Equivalents to determine and assess the reasonably fair scope of the present invention as it pertains to any apparatus, assembly, or method not materially departing from but outside the literal scope of the invention as set forth in the following claims.

What is claimed is:

1. An integrated closed-loop method of counteracting the effects of vibratory forces produced by an engine, and isolating the forces from an adjacent body, wherein said engine presents a manifold absolute pressure, crank angle, $\theta$, speed, $\omega$, and firing frequency equal to $\omega$ times an order, p, said method comprising the steps of:
   a) inputting the firing frequency and the manifold absolute pressure into an open-loop control algorithm;
   b) executing the open-loop control algorithm after receiving the angle and order to determine an open-loop control input;
   c) inputting engine characteristic data, including the frequency, into a closed-loop control algorithm;
   d) executing the closed-loop control algorithm after receiving the characteristic data to determine a closed-loop control input;
   e) combining the open and closed-loop control inputs to achieve a resultant control input signal;
   f) activating and delivering the resultant control input signal to at least one active engine mount secured intermediate the engine and body so as to generate a counteracting output and result in a current residual vibration at the mount; and
   g) determining the current residual vibration, modifying the characteristic data to include the current residual vibration, and feeding the current residual vibration back to the closed-loop control algorithm.

2. The method as claimed in claim 1, wherein steps (c) through (g) are repetitively performed in sequential order, and the closed-loop control input converges upon a target value.

3. The method as claimed in claim 1, wherein both the open and closed-loop algorithms are designed in frequency domain, and a Fourier coefficient of the residual vibration signal is inputted into the closed-loop algorithm.

4. The method as claimed in claim 3, wherein the open-loop control algorithm includes determining open-loop coefficients by comparing the pressure and frequency to a look-up table.

5. The method as claimed in claim 4, wherein the open-loop control algorithm is designed by setting a target residual vibration of zero to determine a weighted least square solution of the control inputs as function of disturbance, and measuring a disturbance scalar off-line, so as to determine the coefficients as a function of crank speed and pressure.

6. The method as claimed in claim 5, wherein the engine presents a torque excitation frequency having an intensity, the residual vibration is further produced by an engine torque disturbance based on the excitation frequency and intensity, and the open-loop control algorithm includes application of the following formula for determining the open-loop control input:

$$\tilde{u}_o = -[\tilde{G}(j p\omega)^* Q \tilde{G}(j p\omega)]^{-1} \tilde{G}(j p\omega)^* Q \tilde{d}$$

where, Q is a positive definite matrix
d-tilde is the disturbance, and
G-tilde is a secondary path transfer function.

7. The method as claimed in claim 1, wherein step g) further includes the steps of securing a force (or acceleration) sensor at each of said at least one mount, sensing the current residual vibration at each mount, and generating and feeding back to the closed-loop algorithm a current residual vibration signal.

8. The method as claimed in claim 1, wherein the closed-loop control algorithm presents a Single-Tone Adaptive Feedforward Control having an update sub-routine.

9. The method as claimed in claim 8, wherein the update sub-routine includes application of the following adaptation formula for determining the new closed-loop control input:

$$\tilde{u}_{c,new} = \tilde{u}_{c,old} - \gamma \tilde{G}^*(j p\omega) Q \tilde{r}_{c,old}$$

and, u-tilde is the closed-loop control input as is new and old,
Q is a positive definite matrix,
G-tilde is a transfer function matrix based on the crank speed, $\omega$, and firing frequency order, p, gamma is a scalar coefficient representing the update gain, and r-tilde$_{c,old}$ is a single-column matrix of the current residual vibration signals at the mounts.

10. The method as claimed in claim 9, wherein steps (c) through (g) are repetitively performed in sequential order, and the closed-loop control algorithm is implemented by collecting vibration signal data over a period, calculating p$^{th}$ order Fourier coefficient for the data, updating the Fourier coefficients of the closed-loop control input, and waiting until the current residual vibration falls below a maximum threshold before starting a new collection of vibration signal data.

11. The method as claimed in claim 9, wherein a true transfer function including a multiplicative deviation for modeling a true system is utilized during execution of the update sub-routine.

12. The method as claimed in claim 11, wherein gamma satisfies the following inequality:

$$\gamma \leq \frac{1}{2\overline{\sigma}\{\tilde{G}^*(j\omega)Q\tilde{G}(j\omega)\}}.$$

13. The method as claimed in claim 9, wherein the closed-loop control algorithm is implemented by using a time-domain approximation to modify the adaptation formula.

14. The method as claimed in claim 13, wherein the adaptation formula is modified, so as to present the following formula:

$$\tilde{u}(t_{k+1}) = \tilde{u}(t_k) - \mu \hat{\tilde{G}}(jp\omega)^* Qr(t_k)e^{-j\omega t_k},$$

and, $\mu$ is a lumped gain of gamma and discrete sampling time.

15. The method as claimed in claim 14, wherein $\mu$ is manually tunable between predetermined hypo-responsive minimum and unstable maximum thresholds.

16. The method as claimed in claim 14, wherein steps f) and g) further include the steps of recording an initial activation time for the active engine mounts, comparing the residual vibration to an acceptable threshold, steps c) through g) are repetitively performed until the residual vibration falls below the acceptable threshold, and step g) further includes determining an acceptable residual vibration time when the vibration falls below the acceptable threshold, subtracting the initial activation time from the acceptable residual vibration time to determine a system responsiveness period, and tuning $\mu$ based on the period.

17. The method as claimed in claim 16, wherein steps a) through g) are autonomously performed, and $\mu$ is autonomously tuned.

18. An integrated closed-loop method of counteracting the effects on a body of vibration produced by an engine, wherein said engine presents a manifold absolute pressure, crank angle, $\theta$, speed, $\omega$, and firing frequency equal to $\omega$ times an order, p, said method comprising the steps of:

a) inputting the firing frequency and the manifold absolute pressure into an open-loop control algorithm;

b) executing the open-loop control algorithm including comparing the pressure and frequency to a look-up table, so as to determine an open-loop control input;

c) inputting engine characteristic data, including the frequency, into a closed-loop control algorithm;

d) executing the closed-loop control algorithm after receiving the characteristic data to determine a closed-loop control input;

e) combining the open and closed-loop control inputs to achieve a resultant control input signal;

f) applying the resultant input signal to a secondary path transfer function to determine a control response vector;

g) detecting a torque variation based on the pressure, angle, and speed, and applying the torque variation to a primary path transfer function to determine a disturbance vibration vector;

h) activating at least one active engine mount secured intermediate the engine and body, and delivering the control response and disturbance vibration vectors to said at least one mount, so as to generate a counteracting output and result in a current residual vibration at the mount; and i) determining the current residual vibration, modifying the characteristic data to include the current residual vibration, and feeding the current residual vibration back to the closed-loop control algorithm.

19. A system adapted for use with an engine presenting engine characteristics, and for isolating engine produced vibratory forces from a body, said system comprising:

at least one active engine mount intermediately positionable between the engine and body, and including a generator;

at least one force sensor adjacent each of said at least one mount, and configured to detect the vibratory forces at the mount and generate a corresponding current vibration signal;

a controller communicatively coupled to the engine, mount and sensor, and configured to receive the engine characteristics and signal, perform integrated open and closed-loop control algorithms, so as to determine a control input, and transmit the control input to the generator, said controller including a memory storage device having a look-up table stored thereupon and said open-loop control algorithm is performed by comparing the engine characteristics to the table.

20. The system as claimed in claim 19, further comprising:

at least one power amplifier intermediately coupled to the controller and each of said at least one active engine mount.

* * * * *